United States Patent [19]

Ueno

[11] Patent Number: 5,846,040
[45] Date of Patent: Dec. 8, 1998

[54] PUSH-RIVET

[75] Inventor: Eiji Ueno, Utsunomiya, Japan

[73] Assignee: Nifco Inc., Yokohama, Japan

[21] Appl. No.: 834,925

[22] Filed: Apr. 7, 1997

Related U.S. Application Data

[63] Continuation of Ser. No. 571,383, Dec. 13, 1995, abandoned.

[30] Foreign Application Priority Data

Dec. 27, 1994 [JP] Japan ........................... 6-337946

[51] Int. Cl.$^6$ ............................. F16B 13/06; F16B 33/00
[52] U.S. Cl. ................... 411/45; 411/60; 411/369
[58] Field of Search ................... 411/45–48, 55, 411/57, 915, 542, 369, 60

[56] References Cited

U.S. PATENT DOCUMENTS

| | | | |
|---|---|---|---|
| 3,153,971 | 10/1964 | Lovisek | 411/369 |
| 3,595,506 | 7/1971 | Saunders | 411/48 |
| 4,776,737 | 10/1988 | Wollar | 411/369 |
| 4,875,818 | 10/1989 | Reinwell | 411/542 |
| 4,948,314 | 8/1990 | Kurosaki | 411/55 |
| 5,211,519 | 5/1993 | Saito | 411/45 |

FOREIGN PATENT DOCUMENTS

6-24220  3/1994  Japan .

*Primary Examiner*—Flemming Saether
*Attorney, Agent, or Firm*—Oblon, Spivak, McClelland, Maier & Neustadt, P.C.

[57] ABSTRACT

A pin grommet includes a male member that has a head and a shaft that extends integrally from the head, and a female member that has a flange in which a through hole is formed for insertion of the shaft, and a plurality of resilient members around the through hole extending from the flange. A resilient seal is provided on the side of the male member head on which the shaft is located, and another resilient seal is disposed on the side of the female member flange on which the resilient members are located. The resilient members on the female portion are splayed outward by insertion of the male member shaft into the female member through hole, thereby holding the male member in engagement with the female member.

3 Claims, 6 Drawing Sheets

PUSH-RIVET

This application is a Continuation of application Ser. No. 08/571,383, filed on Dec. 13, 1995, now abandoned.

BACKGROUND OF THE INVENTION

1. Field of the Invention

The present invention relates to a pin grommet used for ensuring a watertight attachment between two parts.

2. Description of the Prior Art

When it is necessary to ensure that there is a watertight fit between one part attached to another, for example a vehicle trim panel or the like attached to a vehicle body panel, grommets are used having a structure that ensures a watertight fit between grommet attachment holes formed in each of the two panels.

Figure 10:
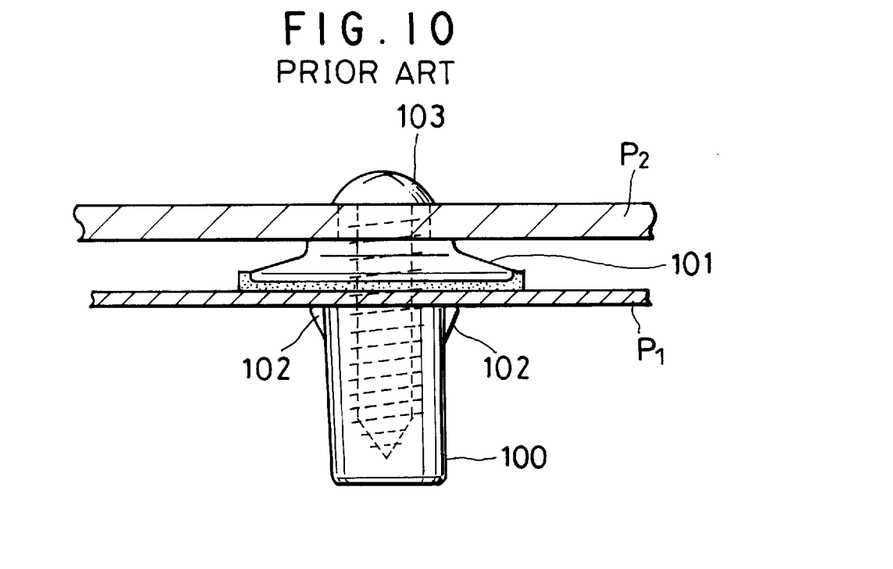
FIG. 10 is a side view of a conventional pin grommet arrangement.

FIG. 10 shows an example of a screw grommet for this purpose, disclosed in JP-A-HEI-6-24220. This grommet comprises a body portion 100 in the shape of a cylinder closed at the bottom end, and a flange 101 of heat-meltable or thermoplastic resin around the rim of the cylinder opening. The grommet body 100 is inserted into an attachment hole formed in an attachment panel $P_1$, and the flange 101 is then heated to melt or soften it to ensure a seal between the attachment hole and the grommet body 100. Although there is no seal between the trim panel $P_2$ and screw 103, since the lower end of the grommet body 100 is closed, any rainwater or the like that enters between the trim panel $P_2$ and the screw 103 does not find its way behind the attachment panel $P_1$.

However, in the case of this screw grommet the attachment of the grommet body 100 to the panel $P_1$ is effected between the flange 101 and engaging claws 102 provided around the open end of the body 100, which makes the screw grommet difficult to apply with respect to attachment panels $P_1$ of different thicknesses. Moreover, the panel $P_2$ cannot be readily snapped into attachment in a single operation because it is necessary to melt or soften the flange 101 to ensure the seal, and it is also necessary to screw the screw 103 into the grommet body 100 to attach the panel $P_2$. In addition, as the flange 101 is used to effect the seal, it is also necessary to provide enough space between the panels $P_2$ and $P_1$ to accommodate the thickness of the flange 101.

Figure 11:
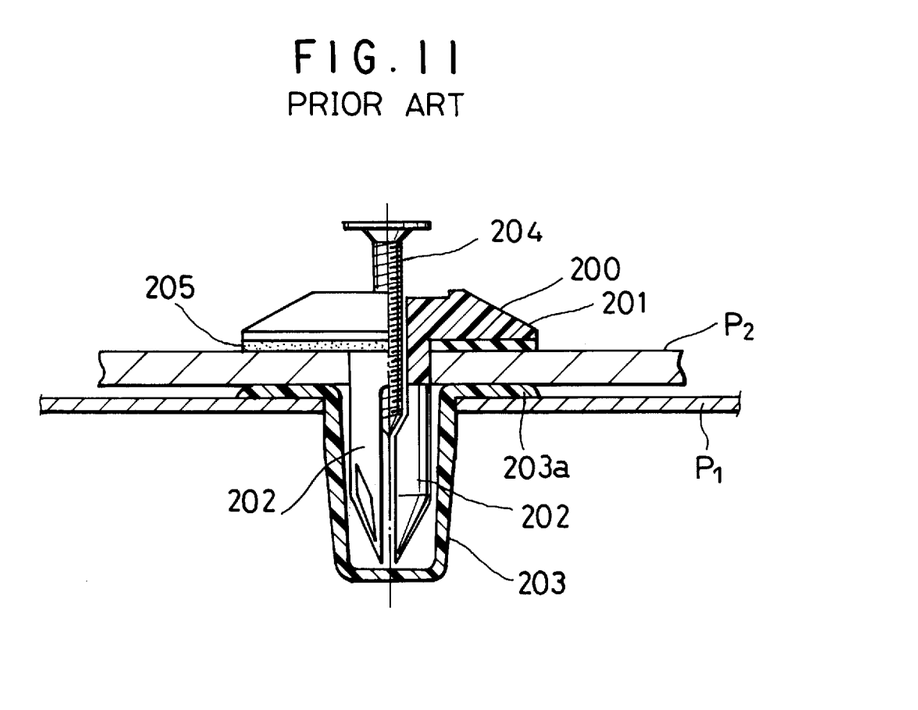
FIG. 11 is a cross-sectional side view showing another conventional pin grommet arrangement.

Another type of screw grommet arrangement is shown in FIG. 11. This grommet includes a grommet body 200 with a flange 201 provided on one side with a plurality of resilient members 202 that are flexed outward by the insertion of a screw 204, and a cylindrical rubber boot 203 having a closed lower end and a flange 203a extending outward from the edge at the open end. The resilient members 202 are inserted into the boot 203 located in an attachment hole in an attachment panel $P_1$, and the screw 204 is then inserted into the grommet body 200. This causes the resilient members 202 to be flexed outward, dilating part of the boot 203 and thereby holding the grommet body 200 in engagement in the attachment panel $P_1$, whereby the panel $P_2$ is clamped in position between the flange 201 and the attachment panel $P_1$. The flange 201 is provided with sealing material 205 on the same side as the resilient members 202. This sealing material 205 provides a seal between attachment hole of the panel $P_2$ and the grommet body 200, and prevents any water that enters between the screw 204 and the grommet body 200 from getting behind the attachment panel $P_1$.

Since in the screw grommet arrangement shown in FIG. 11 the grommet body 200 is attached to the attachment panel $P_1$ by expanding the resilient members 202 against the attachment panel $P_1$, it can be applied to attachment panels $P_1$ of various thicknesses. Moreover, the panel $P_2$ can be readily attached by just inserting the screw 204 into the grommet body 200. However, using this type of screw grommet requires that the boot 203 first be affixed in the attachment hole of the attachment panel $P_1$. Also, it requires a fairly considerable force to drive the screw 204 into the grommet body 200 to flex the resilient members 202 outward and expand the boot 203 against the attachment panel $P_1$. Furthermore, this screw grommet arrangement also requires the provision of enough space between the panels $P_2$ and $P_1$ to accommodate the thickness of the flange 203a.

The object of the present invention is to provide a pin grommet for readily attaching a panel to another panel so that the attachment is watertight with no space between the panels.

SUMMARY OF THE INVENTION

For attaining these objects, the present invention provides a pin grommet, comprising a male member that includes a head and a round shaft that extends integrally from the head, a female member that includes a flange in which a through hole is formed for insertion of the round shaft, and a plurality of resilient members around the through hole that extend from one surface of the flange, a first resilient seal disposed on the side of the male member head on which the shaft is located, and a second resilient seal disposed on the side of the female member flange on which the resilient members are located, wherein the resilient members of the female member are splayed outward by insertion of the male member shaft into the female member through hole, thereby holding the male member in engagement with the female member.

The objects are also attained by a pin grommet as described above, which includes an annular projection disposed around a peripheral portion of the female member through hole on a side of the female member flange on which the resilient members are not located, with the annular projection pressing into the first resilient seal between the flange and the head of the male member, and an annular projection disposed around a peripheral portion of the female member through hole on the side of the female member flange on which the resilient members are located, with the annular projection pressing into the second resilient seal between the surface of a panel to be attached by the pin grommet and the female member flange.

In the pin grommet of this invention, the side of the male member head on which the shaft is located has a resilient seal that is formed as an integral part of the male member or which can be attached to the male member. Similarly, also, the side of the female member flange on which the resilient members are located has a resilient seal which is formed as an integral part of the female member or which can be attached thereto. Thus, when the female member is fitted into an attachment hole formed in a panel to be attached to another panel, and the resilient members on the female portion are splayed outward by insertion of the male member shaft into the female member through hole, thereby holding the male member in engagement with the female member, the resilient seal on the female member provides a watertight seal between the female member and the panel attachment hole, while the resilient seal on the male member provides a watertight seal between the through hole in the female member and the male member.

Furthermore, the inclusion of an annular projection disposed around a peripheral portion of the female member through hole on the side of the female member flange without the resilient members, arranged so that the annular projection presses into the resilient seal between the flange and the head of the male member, provides a further enhancement of the sealing properties of the seal without deforming the seal itself. Similarly, the annular projection around a peripheral portion of the female member through hole on the side of the female member flange on which the resilient members are located that presses into the resilient seal between the surface of a panel to be attached by the pin grommet and the female member flange, further enhances the sealing properties of that seal.

Further features of the invention, its nature and various advantages will be more apparent from the accompanying drawings and following detailed description of the invention.

DESCRIPTION OF THE PREFERRED EMBODIMENTS

Figure 1:
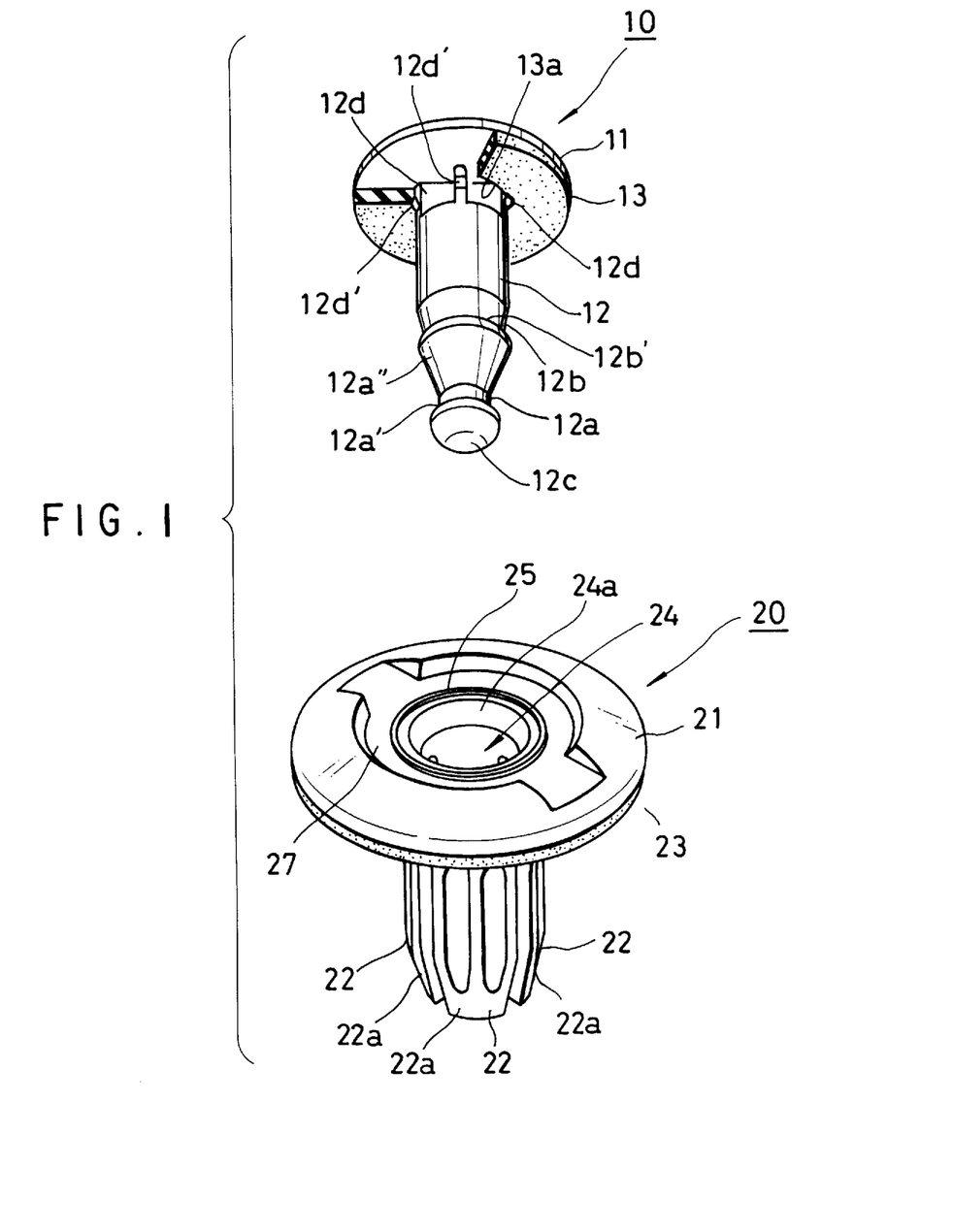
FIG. 1 is a perspective view of an embodiment of the grommet of this invention, showing the male and female members separated.
Figure 2:
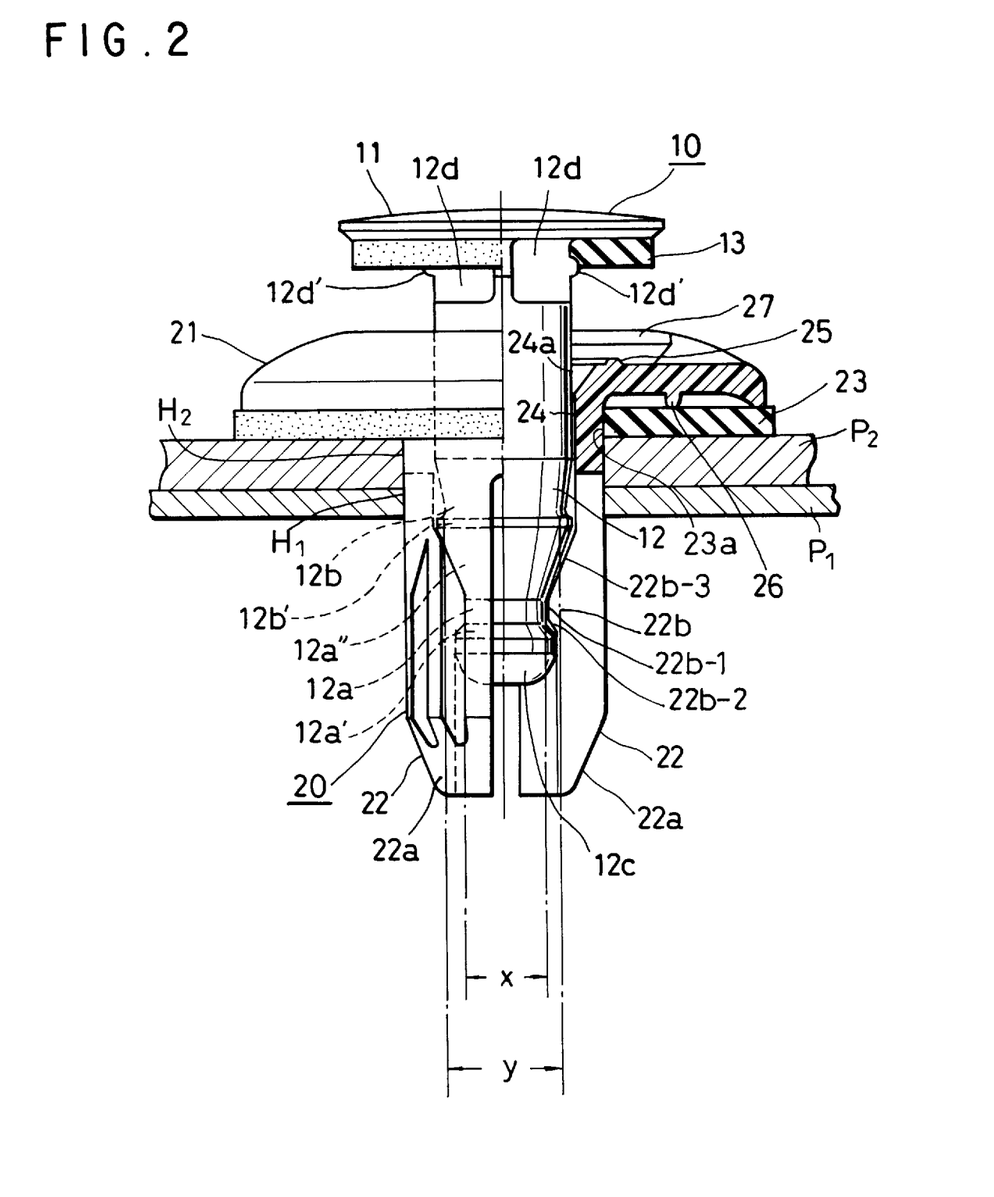
FIG. 2 is a partially cutaway cross-sectional side view showing the grommet of FIG. 1 provisionally assembled.
Figure 3:
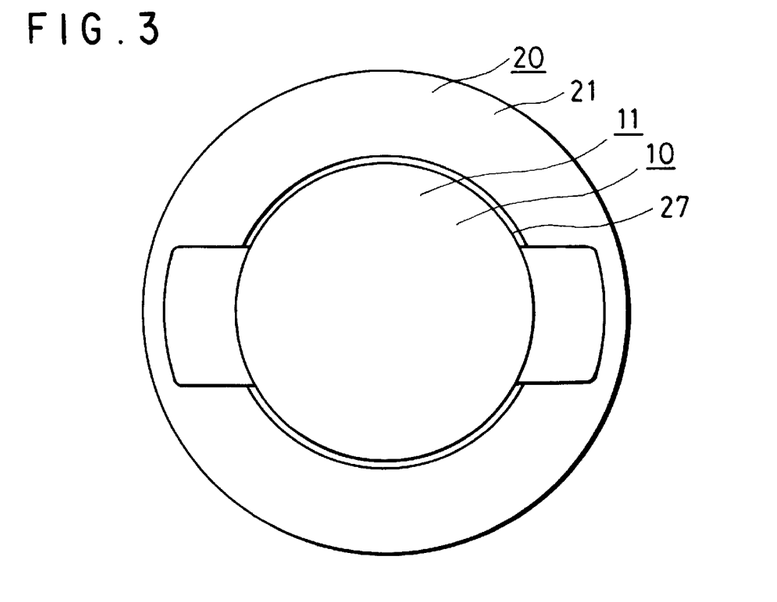
FIG. 3 is a plan view of the grommet of FIG. 1.
Figure 4:
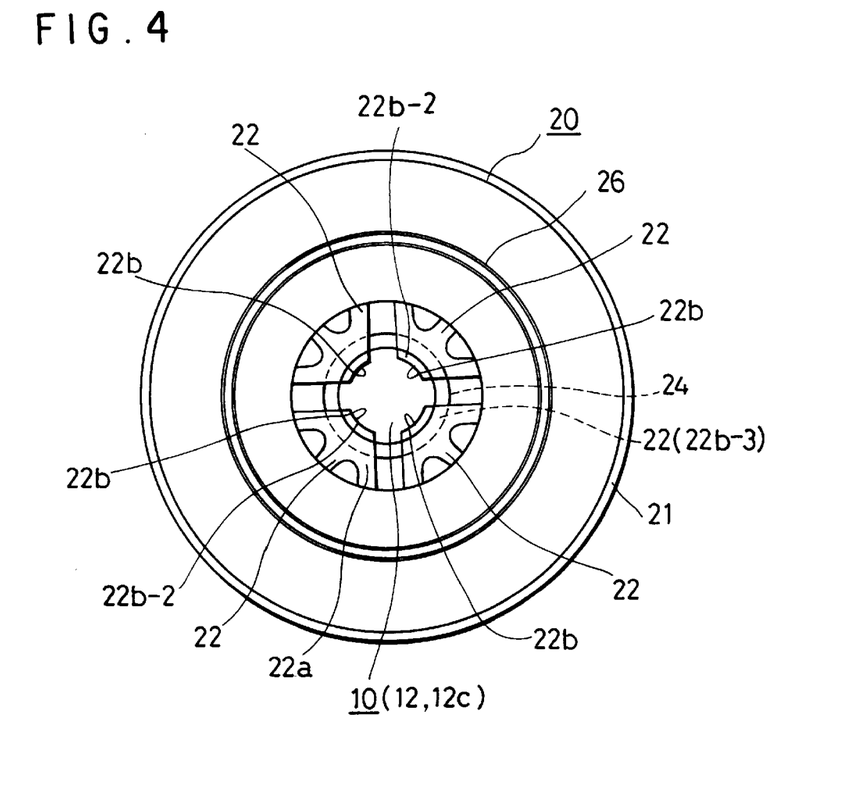
FIG. 4 is a bottom view of the grommet of FIG. 1.

The embodiments of the present invention will now be described with reference to FIGS. 1 to 9. FIG. 1 shows the pin grommet of this invention, constituted by a male member 10 and a female member 20, shown separated to illustrate the overall configuration. FIG. 2 shows the grommet with resilient members 22 of the female member 20 inserted into attachment holes $H_2$ and $H_1$ formed in panels $P_2$ and $P_1$, for the purpose of attaching panel $P_2$ to attachment panel $P_1$. FIG. 3 shows the grommet viewed from above, while FIG. 4 shows the grommet viewed from below, with a seal 23 omitted.

Figure 5:
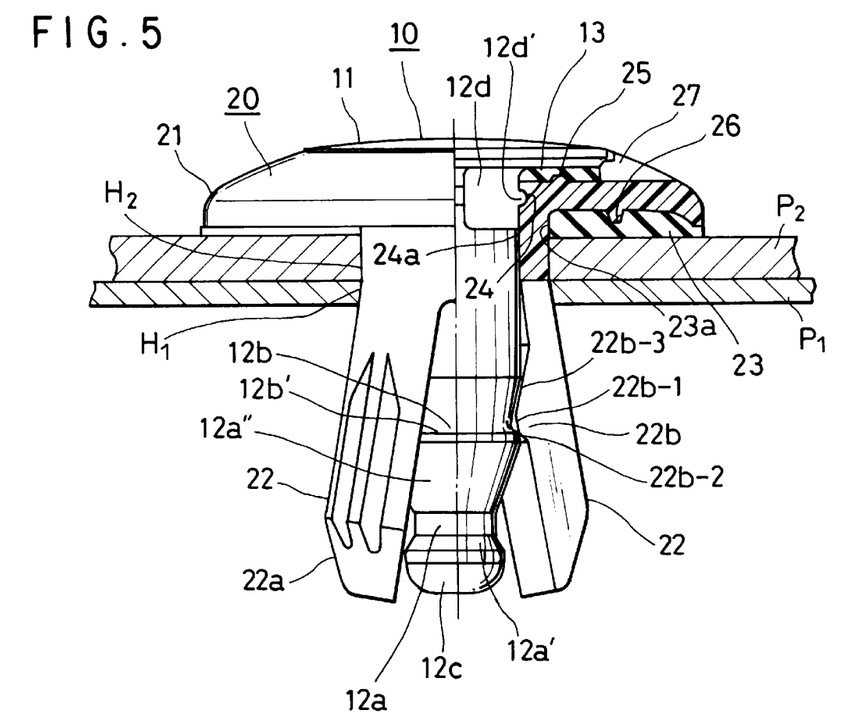
FIG. 5 is a partially cutaway cross-sectional side view showing the grommet of FIG. 1 attached in place.
Figure 6:
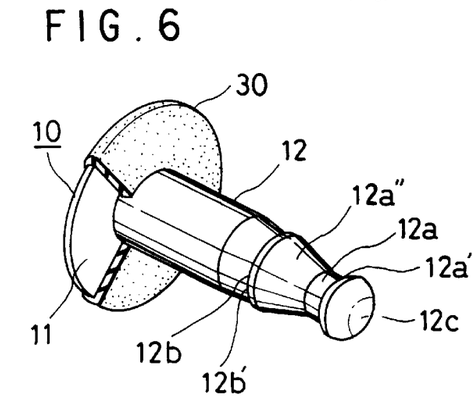
FIG. 6 is a perspective view of a male member of a grommet according to another embodiment of the invention.
Figure 7:
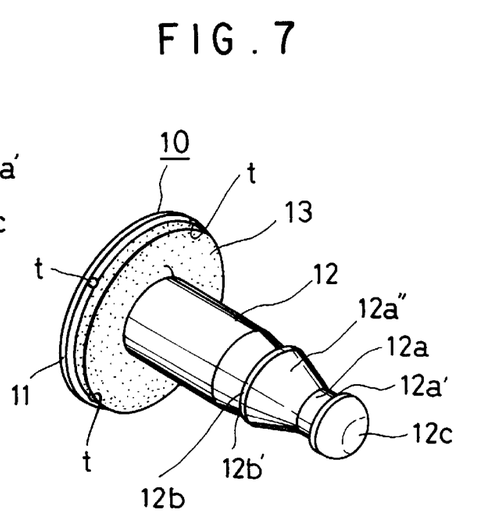
FIG. 7 is a perspective view of a male member of a grommet according to a further embodiment of the invention.
Figure 8:
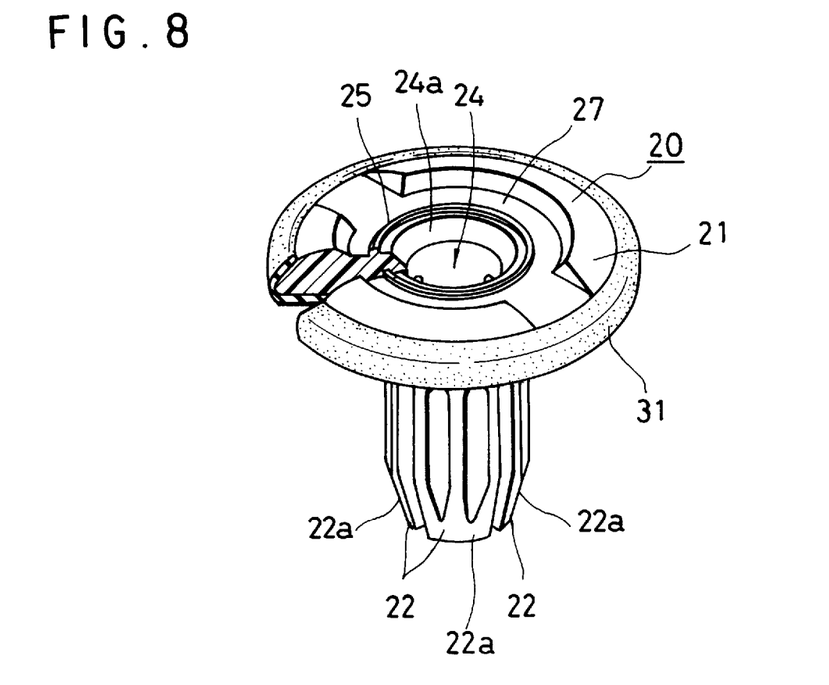
FIG. 8 is a perspective view of a female member of a grommet according to a further embodiment of the invention.
Figure 9:
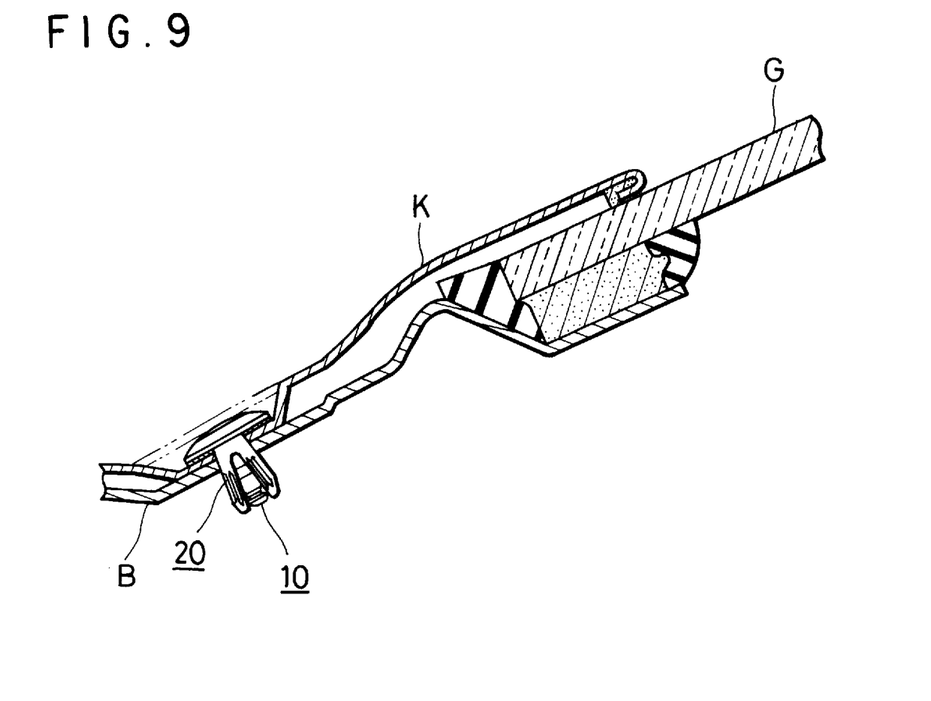
FIG. 9 is a cross-sectional side view showing the grommet of the invention used to attach a cowl top panel to a vehicle body panel.

FIG. 5 is a partially cutaway view showing the female member 20 inserted in place in the attachment holes $H_2$ and $H_1$ of the panels $P_2$ and $P_1$ with the resilient members 22 splayed outward by the insertion of the male member 10 into the female member 20. FIGS. 6 and 7 show modified versions of the male member 10, while FIG. 8 shows a modified version of the female member 20. FIG. 9 is a partially cross-sectional view showing the pin grommet of the invention being used to attach a cowl top panel K to a vehicle body panel B.

The pin grommet, as shown in the above drawings, comprises a male member 10 having a head 11 and a round shaft 12 that integrally extends from the head 11, and a female member 20 having a flange 21 in which a through hole 24 is formed for the insertion of the shaft 12, and a plurality of resilient members 22 extending along the through hole 24 from one surface of the flange 21.

The pin grommet is thus constituted by the male member 10 and female member 20 so that inserting the male member 10 into the female member 20 splays the resilient members 22 outward and locks male member 10 and female member 20 together. The distance between the ends of opposing pairs of resilient members 22 is greater than the diameter of the attachment hole $H_2$ of the attachment panel $P_1$ into which the resilient members 22 are inserted. Thus, the grommet is locked into engagement in the attachment hole $H_1$ when the resilient members 22 are splayed outward, clamping the panel $P_2$ between the female member flange 21 and the attachment panel $P_1$.

More specifically, the shaft 12 of the male member 10 extends from the center part of one side of the disc-shaped head 11 perpendicularly to said surface. The shaft 12 has a first annular recess 12a formed adjacent to a semicircular lower end 12c of the shaft 12. A second annular recess 12b is provided midway along the shaft 12. A tapered surface 12a" is formed between the first annular recess 12a and the second annular recess 12b, with the smaller end of the taper at the first annular recess 12a end. The diameter of the tapered surface 12a" at its widest is substantially the same as the diameter of the base of the shaft 12.

The female member 20 has a through hole 24 in the center of the flange 21 into which the shaft 12 of the male member 10 is inserted, and is provided with four resilient members 22 extending from the periphery of the through hole 24 at right-angles to the plane of the flange 21. As shown in FIG. 4, the resilient members 22 are positioned so that the outer and inner surfaces of the members 22 each form an imaginary circle substantially concentric with the through hole 24. As shown by FIGS. 1 and 2, the outside surface at the end portion of each of the members 22 tapers inwards towards the tip to facilitate insertion into the respective attachment holes $H_2$ and $H_1$ of the panels $P_2$ and $P_1$. An inward projection 22b is formed approximately in the center of the inside surface of each resilient member 22. As shown in FIG. 2, each of these projections 22b has a top surface 22b-1 that is substantially parallel with the direction in which the members 22 extend, a slope 22b-2 on the side toward the tip of the members 22, and, on the base side of the members 22, a gently tapered surface 22b-3 that gradually increases the distance between the inside surfaces of the resilient members 22.

The distance x between the top surfaces 22b-1 on the projections 22b of a pair of opposing resilient members 22 is made substantially the same as the diameter of the first annular recess 12a. Therefore, when the shaft 12 of the male member 10 is inserted into the through hole 24 from the side of the female member 20 not provided with resilient members 22, the end 12c first slides along the tapered surface 22b-3, splaying the resilient members 22 outward. Then, when the end 12c passes over the projection 22b, the resilience of the members 22 causes the members 22 to snap back, bringing the projection 22b into engagement in the first annular recess 12a, to thereby provisionally engage the male member 10 in the female member 20.

The provisional engagement of the male member 10 in the female member 20 can be achieved since with the projections 22b thus engaged in the first annular recess 12a, even if the male member 10 is pulled in the direction of withdrawal from the female member 20, the male member 10 is prevented from being withdrawn by contact of a first sloped surface 12a' between the first annular recess 12a and the end 12c against the slope 22b-2. This provisional engagement facilitates the operation of inserting the resilient members 22 of the female member 20 of the pin grommet into mutually aligned attachment holes $H_2$ and $H_1$ of panels $P_2$ and $P_1$, as shown in FIG. 2, without any risk of the male member 10 falling out of the female member 20.

The pin grommet is also formed so that the distance x between the top surfaces 22b-1 of the projections 22b on a pair of opposing resilient members 22 is less than the diameter y of the second annular recess 12b on the shaft 12. Consequently, when male member 10 is inserted further in, past the position of provisional engagement between the projection 22b and the first annular recess 12a, the tapered surface 12a'' slides along the tapered surface 22b-3, gradually splaying out the resilient members 22, until the trailing edge of the tapered surface 12a'' passes over the projection 22b, at which point the resilient members 22 can snap back in by the amount of the difference between the diameter of the trailing edge of the tapered surface 12a'' and the diameter of the second annular recess 12b, bringing the projection 22b into alignment in the second annular recess 12b, whereby the male member 10 is held in full engagement in the female member 20 with the resilient members 22 flexed outward by the amount of the difference between the above dimensions x and y, as shown in FIG. 5.

The full engagement of the male member 10 in the female member 20 can be achieved since with the projections 22b thus engaged in the second annular recess 12b, even if the male member 10 is pulled in the direction of withdrawal from the female member 20, the male member 10 is prevented from being withdrawn by contact of a second sloped surface 12b' between the second annular recess 12b and the trailing edge of the tapered surface 12a'' against the slope 22b-2. In this way, the further insertion of the male member 10 provisionally engaged with the female member 20, the resilient members 22 of which are inserted into mutually aligned attachment holes $H_2$ and $H_1$ of panels $P_2$ and $P_1$, allows the full engagement to be effected between the male member 10 and the female member 20 with the resilient members 22 of the female member 20 maintained in the splayed state, as shown in FIG. 5. Thus, all that has to be done to fix the female member 20 in the attachment hole $H_1$ of an attachment panel $P_1$ is to insert the male member 10 as described above, enabling attachment between a panel $P_2$ and the attachment panel $P_1$ to be readily effected in a single operation that fixes the panel $P_2$ between the female member flange 21 and the attachment panel $P_1$.

It is desirable that the female member 20 be formed integrally of plastic to provide the resilient members 22 with the required elastic deformation properties. In this embodiment of the pin grommet, a doughnut-shaped resilient seal 13 is disposed on the surface of the head 11 on which the shaft 12 is located. The outside diameter of this seal 13 is substantially the same as that of the head 11, and the seal 13 has a hole 13a, the diameter of which is substantially the same as the diameter of the base of the shaft 12, to allow the seal 13 to be fitted around the base of the shaft 12. The portion where the base of the shaft 12 is connected to the head 11 has an axially cruciform cross-section formed by four fins 12d extending outward, perpendicular to the center axis of the shaft 12. The end of each of these fins 12d has a projection 12d' that projects beyond the peripheral surface of the base of the shaft 12. These projections 12d' dig into the hole 13a of the seal 13, thereby maintaining the seal 13 in tight contact with the head 11 of the male member 10.

There is also a doughnut-shaped resilient seal 23 disposed on the side of the flange 21 on which the resilient members 22 are provided. The outside diameter of the seal 23 is substantially the same as that of the flange 21, and the seal 23 has a hole 23a with a diameter which is substantially the same as the outside diameter of the resilient members 22 to allow the seal 23 to be fitted around the base of the resilient members 22.

Thus, when the male member 10 is inserted into the female member 20 until the resilient members 22 are splayed out, thereby holding the female member 20 in the attachment hole $H_1$ of the attachment panel $P_1$, as shown in FIG. 5, the resilient seal 23 squeezed between the flange 21 and the panel $P_2$ ensures that a watertight seal is maintained between the attachment hole $H_2$ and the female member 20, and the resilient seal 13 squeezed between the head 11 and the flange 21 ensures that a watertight seal is maintained between the through hole 24 and the male member 10. It is preferable to constitute the seals 13 and 23 of cellularly-formed neoprene rubber or other such rubber material, or of a plastic material that is relatively easily elastically deformable.

The side of the flange 21 not provided with resilient members 22 has an annular projection 25 disposed around the outside of the rim portion of the through hole 24, so the annular projection 25 is between the flange 21 and the head 11 of the male member 10. Thus, this annular projection 25 presses into the seal 13, further enhancing the watertightness between the through hole 24 and the male member 10.

The side of the flange 21 that does have the resilient members 22 has an annular projection 26 disposed around the outer side of the resilient members 22, that is, between the flange 21 and the surface of the panel $P_2$ in which the female member 20 is affixed. This projection 26 presses into the seal 23, further enhancing the watertightness between the female member 20 and the attachment hole $H_2$ of the panel $P_2$.

Providing a projection 26 to further enhance watertightness also enables the size of the seal 23 to be reduced to less than the diameter of the flange 21. The result is that when the male member 10 is in full engagement with the female member 20, as shown in FIG. 5, the appearance of the grommet is improved by the elimination of the parts of the seal 23 that would otherwise be bulging out around the edge of the flange 21.

The edge of the through hole 24 on the side with no resilient members 22 is provided with an inwardly tapered portion 24a. This tapered portion 24a facilitates the insertion of the shaft 12 into the through hole 24 of the female member 20 and, when the male member 10 and female member 20 are in full engagement, the tapered portion abuts against the projections 12d' on the fins 12d at the base of the shaft 12. This contact between the projections 12d' and the tapered portion 24a ensures that the male member 10 is not inserted beyond that point, thereby preventing possible damage to the seal 13 by the annular projection 25 on the female member 20 being forced too deeply into the seal 13. In this embodiment, the flange 21 is provided with a recess 27 to accommodate the head 11 of the male member 10, so that when fully engaged, the flange 21 and head 11 of the pin grommet seen on the panel $P_2$ present a flat appearance.

The pin grommet thus configured as described above enables a panel $P_2$ to be readily attached to an attachment panel $P_1$ with good watertightness simply by inserting the male member 10 in the female member 20. The pin grommet is therefore suitable in cases where there is a need to swiftly and securely attach parts together in a watertight condition, such as in FIG. 9, for example, which shows a cowl top panel K or the like attached to a body panel B so that the lower edge of the window glass G of a vehicle is covered.

While in the above-described configuration the doughnut-shaped resilient seal 13 disposed in contact with the side of the head 11 on which the shaft 12 is located is held in place by projections 12d' on the fins 12d, an alternative arrangement may be used such as the one shown in FIG. 7 in which the seal 13 is kept in position by appropriate projections t around the edge of the head 11. Also, adhesive could be used to bond the seal 13 to the head 11 and the seal 23 to the flange 21.

In another arrangement shown in FIG. 6, after being formed the edge together with the side of the male member 10 having the shaft 12 could be integrally covered with a resilient sealing layer 30. In another arrangement, shown in FIG. 8, the edge and the side of the flange 21 on which the resilient members 22 are located could be covered with a resilient sealing layer 31.

As described in the foregoing, the pin grommet according to this invention includes a resilient seal 13 applied to or formed integrally on the side of the male member head 11 on which the shaft 12 is located, and a resilient seal 23 applied to or formed integrally on the side of the female member flange 21 on which the resilient members 22 are provided, enabling a watertight seal to be achieved between the female member 20 and the attachment hole $H_1$ of an attachment panel $P_1$, and between the female member through hole 24 and the male member 10 by just inserting the male member 10 into the female member 20. Thus, the pin grommet of this invention facilitates the watertight attachment of one panel to another panel, and allows this watertight attachment of the panels to be effected without requiring a space between the panels.

What is claimed is:

1. A push-rivet comprising:
    a male member that includes a head and a shaft that extends integrally from the head,
    a female member that includes a flange in which a through hole is formed for insertion of the shaft, and a plurality of resilient members around the through hole that extend from one surface of the flange,
    a first resilient seal disposed on a side of the male member head on which the shaft is located,
    a second resilient seal disposed on a side of the female member flange on which the resilient members are located, and
    an annular projection disposed around a peripheral portion of the female member through hole on a side of the female member flange on which the resilient members are not located, with the annular projection pressing into the first resilient seal between the flange and the head of the male member,
    wherein the resilient members on the female member are splayed outward by insertion of the male member shaft into the female member through hole, thereby holding the male member in engagement with the female member.

2. A push-rivet according to claim 1, further including an annular projection disposed around a peripheral portion of the female member through hole on the side of the female member flange on which the resilient members are located, with the annular projection pressing into the second resilient seal between a surface of an object to be attached by the push-rivet and the female member flange.

3. A push-rivet comprising:
    a male member that includes a head and a shaft that extends integrally from the head,
    a female member that includes a flange in which a through hole is formed for insertion of the shaft, and a plurality of resilient members around the through hole that extends from one surface of the flange,
    a first resilient seal made of an easily deformable cellularly-formed material and disposed on a side of the male member head on which the shaft is located,
    a second resilient seal made of an easily deformable cellularly-formed material and disposed on a side of the female member flange on which the resilient members are located, and
    an annular projection disposed around a peripheral portion of the female member through hole on the side of the female member flange on which the resilient members are located, with the annular projection pressing into the second resilient seal between a surface of an object to be attached by the push-rivet and the female member flange,
    wherein the resilient members on the female member are splayed outward by insertion of the male member shaft into the female member through hole, thereby holding the male member in engagement with the female member.

* * * * *